United States Patent [19]

Engeler et al.

[11] Patent Number: 4,937,775

[45] Date of Patent: Jun. 26, 1990

[54] APPARATUS FOR THE CROSS-CORRELATION OF A PAIR OF COMPLEX SAMPLED SIGNALS

[75] Inventors: William E. Engeler, Scotia; Matthew N O'Donnell, Schenectady, both of N.Y.

[73] Assignee: General Electric Company, Schenectady, N.Y.

[21] Appl. No.: 274,473

[22] Filed: Nov. 21, 1988

[51] Int. Cl.$^5$ .......................................... G06F 15/336
[52] U.S. Cl. ............................................... 364/728.03
[58] Field of Search ..................... 364/728.03, 728.05, 364/820, 413.13, 728.04, 728.06, 728.07

[56] References Cited

U.S. PATENT DOCUMENTS

| | | | |
|---|---|---|---|
| 4,025,772 | 5/1977 | Constant | 364/728.03 |
| 4,378,469 | 3/1983 | Fette | 364/728.03 |
| 4,835,689 | 5/1989 | O'Donnell | 364/413.13 |

*Primary Examiner*—Gary V. Harkcom
*Assistant Examiner*—Long T. Nguyen
*Attorney, Agent, or Firm*—Geoffrey H. Krauss; James C. Davis, Jr.; Marvin Snyder

[57] ABSTRACT

Apparatus for the cross-correlation of two complex sampled digital data signals X and Y uses a first N-stage CORDIC rotator of pipeline sequential form for rotating each of the real and imaginary data portions of the first (X) complex sampled signal sequentially through a summation of angles $\theta = \xi_i \alpha_i$ where $\xi_i = +1$ or $-1$, $\alpha_1 = 90°$ and $\alpha_{n-2} = \tan^{-1}(2^{-n})$ for $n = 0, 1, 2, 3, \ldots N-2$) until $X_{Im}$ is approximately zero and a substantially zero phase angle is reached. The sign from each i-th stage, of this first pipeline is also utilized to determine the sign of rotation in each like-positioned i-th stage of a plurality M of additional CORDIC pipeline rotators, where M is the total number of time delays at which the cross-correlation function is evaluated. The real and imaginary portions of the complete M-th interval cross-correlation product are each obtained by multiplying the associated complex output of each of the Y pipeline rotators by the first pipeline magnitude signal output; N samples are then summed to provide at the j-th rotator output the appropriate pair of the real and imaginary parts of the j-th complex digital data output sample C(j).

6 Claims, 2 Drawing Sheets

ASSEMBLE AS SHOWN:

APPARATUS FOR THE CROSS-CORRELATION OF A PAIR OF COMPLEX SAMPLED SIGNALS

BACKGROUND OF THE INVENTION

The present invention relates to arithmetic processing and, more particularly, to novel means, utilizing a plurality of COordinate Rotation DIgital Computer complex multipliers, for performing the cross-correlation of a pair of complex sampled signals.

Signal processing functions of great relative complexity are utilized in many forms of modern electronics equipment. One such function is the cross correlation function of two complex sampled signals, evaluated over S sampled time intervals, so that:

$$C(g) = \sum_{k=0}^{S-1} Y(g)X^*(g+k)$$

where C, X and Y are all complex digital data signals with independent real and imaginary parts. Thus, a large number of multipliers and accumulators are normally required to cross-correlate a first complex digital data input signal X with a second digital data complex signal Y, over S sampling periods, to yield a plurality M of complex digital data output signals C(m), C(m+1), ..., C(m+M-1), where M is a total number of time delays at which the correlation function is evaluated. It is highly desirable to replace all multipliers with circuitry realizing the multiplication function with utilization of more-integratable building blocks, such as adders, shift registers and the like.

Several forms of complex multipliers, utilizing CORDIC apparatus and techniques, are described and claimed in our copending allowed U.S. application Ser. No. 200,491, filed May 31, 1988, which corresponds to U.S. Pat. No. 4,896,287, assigned to the assignee of the present invention and incorporated herein in its entirety by reference. It is highly desirable to provide complex cross-correlation apparatus utilizing CORDIC complex rotators wherever possible, especially as such a cross-correlation apparatus can be fully integrated into a single semiconductor circuit chip. The CORDIC system allows rotation through an angle $\theta$ to be represented as the summation of several sequential rotations, with each rotation being through one of a special set of angles $\alpha$, such that $$\theta = \sum_{i=1}^{n} \xi_i \alpha_i$$

where $\xi_i = +1$ or $-1$. If a first angle $\alpha_1 = 90°$ is defined, then subsequent angles $\alpha$ (for a maximum of N rotations) are given by $$\alpha_{n+2} = \tan^{-1}(2^{-n}), n=0, 1, 2, \ldots, N-2$$

so that the total angle is successively approximated using all of the plurality n of angles $\alpha_i$, with each finer approximation of the angle $\theta$ providing rectangular-coordinate results $x_{n+1}$ and $y_{n+1}$, which are related to a pair of $x_n$ and $y_n$ rectangular-coordinate values for the next-coarsest approximation by the pair of equations:

$$x_{n+1} = K(\theta_i)(x_n + \xi_i y_n/2^n)$$

$$y_{n+1} = K(\theta_i)(y_n - \xi_i x_n/2^n),$$

where $K(\theta_i)$ is a scale factor equal to $\cos(\theta)$. Since each of the $2^{-n}$ factors is in effect a division-by-two operation done n times, and is provided, for binary numbers, by a one-bit shift for each of the n occurrences, the complex multiplication can, except for the scale factor $K(\theta_i)$ multiplication (if needed), be carried out with a set of inverters, multiplexers, registers and adders. It is this technique that is desirable to be applied to a cross-correlator for a pair of complex digital signals.

BRIEF SUMMARY OF THE INVENTION

In accordance with the invention, one presently preferred apparatus for the cross-correlation of two complex sampled digital data signals X and Y, uses: a first N-stage CORDIC rotator means of pipeline sequential form, but devoid of multipliers, for rotating each of the real and imaginary data portions of the first (X) complex sampled signal, expressed in rectangular form (say, as $X_{Re}$ and $X_{Im}$) sequentially through a summation of angles $\theta = \xi_i \alpha_i$ (where $\alpha_i = +1$ or $-1$, $\alpha_1 = 90°$ and $\alpha_{n+2} = \tan^{-1}(2^{-n})$ for n=0, 1, 2, 3, ..., N-2 until $X_{Im}$ is approximately zero and a substantially zero phase angle is reached; the sign $\xi$ of each i-th stage in the first pipeline rotator means is determined by the sign of the imaginary part Q' of the data from the previous stage. The sign of the $Q_i'$ signal from each i-th stage, where $1 \leq i \leq N$, of this first pipeline is also utilized to determine the sign of rotation in each like-positioned i-th stage of a plurality M of additional CORDIC pipeline rotator means, where M is the total number of time delays ($Z^{-1}$), each corresponding to a like number of clock cycles, at which the cross-correlation function is evaluated. The other complex sampled data signal Y is thus rotated through a phase angle opposite to the phase angle rotation in the first pipeline, to provide the correct phase rotation for each j-th one of the M interval terms. Sign information, as well as the magnitude output, of the first CORDIC pipeline rotator is time-delayed to all other pipeline rotators, with a time delay (to the j-th stage) essential equal to j times the common-time-interval utilized. Thus, the appropriate phase sign and amplitude information arrives at the j-th pipeline rotator exactly in coincidence with the Y input data necessary for computation of the j-th component of the cross-correlation function. The real and imaginary-portions of the complete M-th interval cross-correlation product are each then obtained by multiplying the associated complex output of each of the Y pipeline rotator means by the first pipeline magnitude signal output $|X|$. N samples are then summed at the output of each of the M different CORDIC pipeline rotator means, to provide at the j-th rotator output the appropriate pair of the real part and the imaginary part of the j-th complex digital data output sample C(j).

Accordingly, it is an object of the present invention to provide novel apparatus for the cross-correlation of a pair of sampled complex digital data signals.

This and other objects of the present invention will become apparent upon a reading of the following detailed description, when considered in conjunction with the drawings.

DETAILED DESCRIPTION OF THE INVENTION

Figure 1A:
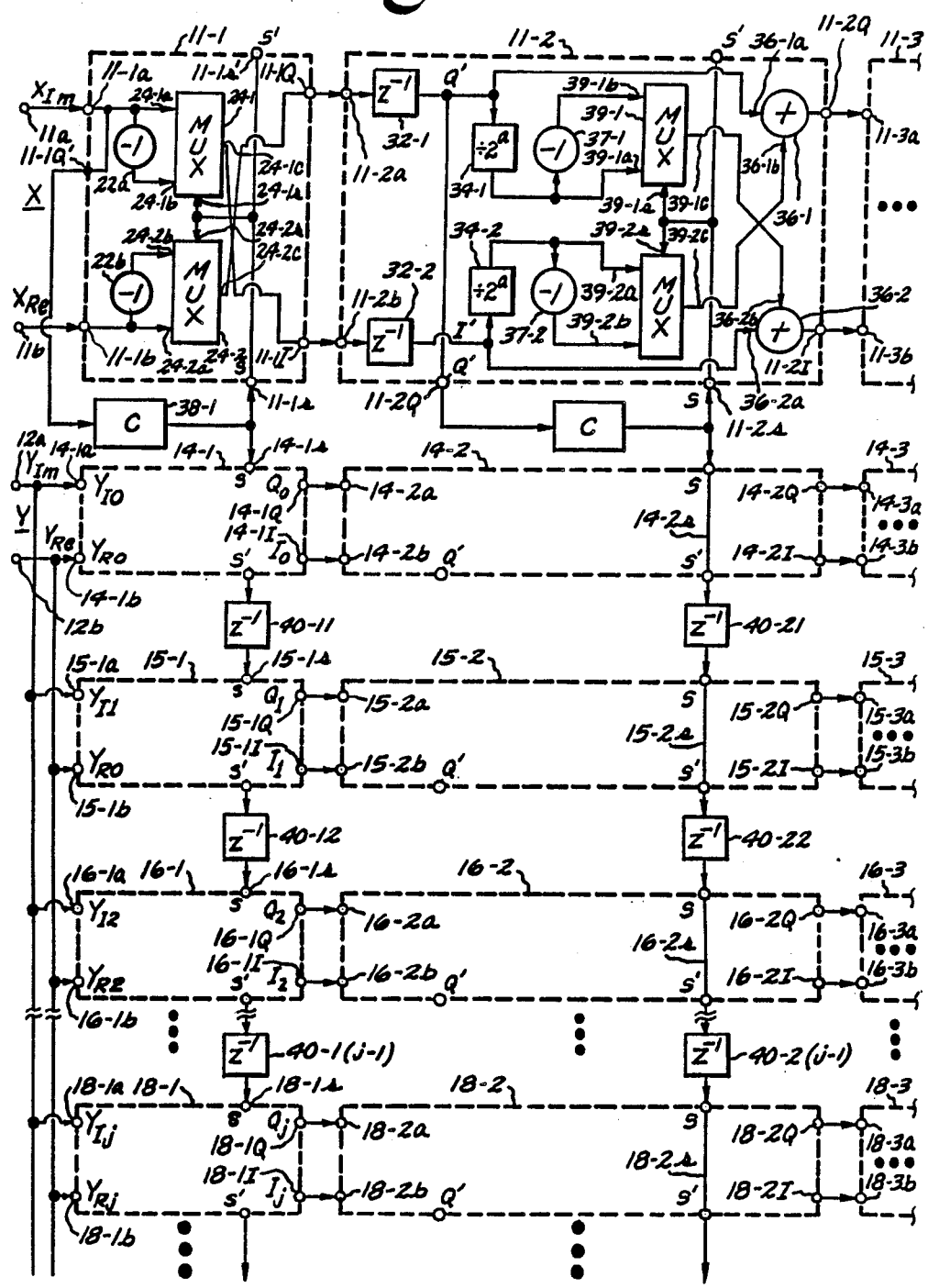
FIG. 1a and 1b, is a schematic diagram of a presently preferred cross-correlator for a pair of complex sampled digital signals, in accordance with the principals of the present invention.
Figures 1, 1B:
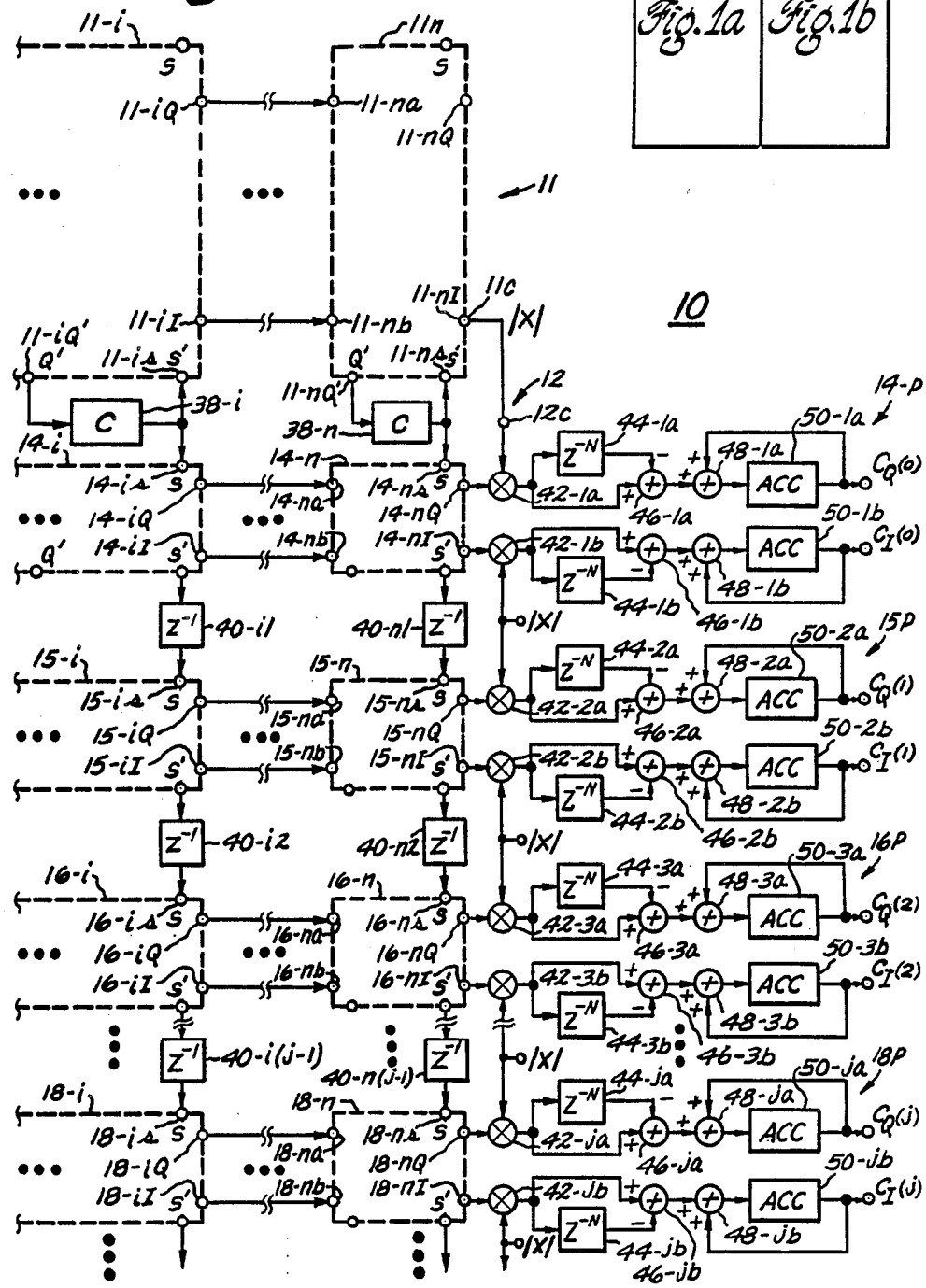
FIG. 1, assembled from left and right-hand drawings

Referring to the sole figure, a presently preferred cross-correlation apparatus 10 utilizes a first CORDIC pipeline sequential rotator means 11, which receives the digital data of a first (or multiplier term) complex sampled signal X in rectangular form (e.g. with a imaginary data portion $X_{Im}$ at a first input 11a and a real data portion $X_{Re}$ at a second input 11b) for providing the multiplier term absolute value |X| at an output 11c. A second (or multiplicand term) complex sampled digital data signal Y is provided with an imaginary-portion $Y_{Im}$ at a first input 12a and a real portion $Y_{Re}$ at a second input 12b, of a second apparatus portion 12, comprised of a plurality M, where M is the total number of time delay ($Z^{-1}$) intervals over which evaluation is to occur, of CORDIC pipelined (sequential) rotator means 14, 15, 16, ..., 18, .... Each rotator means is comprised of N successive sections; the number (M) of the multiplicand pipeline means is established by the total number of time delay intervals over which evaluation is to occur. Thus, correlator 10 includes (M=1) pipeline CORDIC multipliers 11, 14, 15, 16, ..., 18, ... each comprised of N stages; the correlator may be partitioned into a rectangular Nx(M+1) array.

All of the first stages of each of the M+1 pipelines are similar. Illustratively, first pipeline means first stage 11-1 has a first input 11-1a receiving the imaginary-portion of the multiplier X digital data signal and has a second input 11-1b receiving the real portion of the multiplier digital data signal. The binary state of the data bit then present at input 11-1a is inverted by a first data inverter (-1) means 22a, while the binary state of the data bit at input 11-1b is inverted by a second data inverter 22b. The imaginary-portion input data bit is applied to a first input 22-1a of a multiplexer (MUX) means 24-1, while the inverted imaginary-portion data bit is applied to a second input 24-1b thereof; the MUX means output 24-1c (from which the stage Q output 11-1Q is taken) is connected, by MUX 24-1, to one of inputs 24-1a or 24-1b, dependent upon the state of the binary logic signal then present at a select input 24-1s. Similarly, the real-portion multiplier X data bit is applied to a first input 24-2a of a second MUX means 24-2, and a second input 24-2b receives the inverted real-portion data bit; the connection of the output 24-2c, from which the stage 11-1I output is taken, is selected responsive to the state of a binary digital data bit at a select input 24-2s. Both select inputs 24-1s and 24-2s are connected in parallel to a parallel-connected set of a first stage select S terminal 11-1s and a second select S' terminal 11-1s'. The first stage 14-1, 15-1, 16-1, ..., 18-1, ... of each of the M CORDIC multipliers of portion 12 are essentially similar to the first stage 11-1 of portion 11. The outputs of the multiplexer MUX means 24 are exchanged to complete the ±90° rotation, so that the sign of the rotation is determined by the sign of the input imaginary signal at terminal 11-1Q'.

The remaining (N−1) stages of multiplier pipeline means 11 are comprised of essentially similar cells. Second stage 11-2 is a typical cell. Illustratively, stage 11-2 receives the imaginary-portion Q data (from first stage output 11-1Q) at a first input 11-2a and the real-portion I data (from output 11-1i) at a second input 11-2b. The data at each pipeline stage 11-1, 11-2, ..., 11-n is delayed by one common cycle time interval, from the data in the previous stage. This delay is indicated by the symbol $Z^{-1}$, and occurs in an associated one of delay means 32-1 or 32-2. In an actual circuit implementation, the delays may be provided by a pair of transparent data latches, positioned before and after each pipeline stage, and operated by a non-overlapping, two-phase clock signal. The imaginary-portion Q' data is provided: at a stage Q' output 11-2Q'; to the input of a binary divider means 34-1 (which divides the binary data by a factor of $2^a$, where $a=i-2$, and i is the number (between 2 and N) of that stage of the pipeline (counting rightwardly from the left-end pipeline end); and to a first input 36-1a of a first adder means 36-1. Similarly, the delayed real-portion I' data is provided from the output of means 32-2: to the input of a second divide-by-$2^a$ means 34-2; and to a first input 36-2a of a second adder means 36-2. The dividers 34 can be any means (e.g. a wired shift of a stages) which can shift the data bits rightwardly by a bits; in this second stage 11-2 of the pipeline, a=0 and there is no effective shift. The shifted data bits from the output of respective shifter means 34-1 or 34-2 are applied to the input of respective data inverter means 37-1 or 37-2, and to a "true" input 39-1a or 39-2a of multiplexer MUX means 39-1 or 39-2, respectively. The output of respective inverter means 37-1 or 37-2 is applied to the associated "inverted" data input 39-1b or 39-2b of the associated MUX means 39-1 or 39-2. The select inputs 39-1s and 39-2s of both MUX means are connected to the through-stage selection bus 11-2s (connected between stage terminals S and S'), to cause selection of the "true" or "inverted" data to the MUX means outputs 39-1c or 39-2c, respectively responsive to receipt of a first or second logic signal bit state on the 11-2s bus. The MUX means outputs are cross-connected, so that the imaginary-portion MUX means output 39-1c is connected to a second input 36-2b of the real-portion adder means 36-2, while the real-portion MUX means output 39-2c is connected to a second input 36-1b of the imaginary-portion adder means 36-1. If data is provided in two's-complement format, then inverter means 37 may be bit-wise inverters followed, when "inverted" data is selected by the state of the bus, by a carry-in signal to the respective adder means 36. Other means, using bit inverters, half-adders and the like, as known to the art, can be used. The output of the first adder means 36-1 is the imaginary-portion data output 11-2Q and the output of the second adder means 36-2 is the real-portion data output 11-2I of the stage. Each of the remaining (N−2) stages 11-3, ..., 11-i, ..., 11-n of first pipeline rotator means 11 are identical to second stage 11-2, except for the shift value $a=i-2$. Similarly, each of the (N−1) stages of the M pipeline rotator means of portion 12 are identical (except for shift value a); thus, the first rotator means 14 has (N-1) stages 14-2, 14-3, ..., 14-i, ..., 14-n, while the second rotator means 15 has (N-1) stages 15-2, 15-3, ..., 15-i, ..., 15-n and the j-th rotator means 18 has (N-1) stage 18-2, 18-3, ..., 18-i, ..., 18-n, and so forth.

In addition to the (M+1) pipeline rotators, each comprising a similar first stage and (N−1) sequential similar additional stages, cross-correlator 10 also includes N comparator means 38. Each comparator means has an input connected to the imaginary-portion Q data input to that stage. The first comparator means 38-1 has its input connected, via terminal 11-1Q', to the imaginary-portion first stage input 11-1a. Each comparator means has its output connected to the select S input 11-is of the associated stage in the first pipeline rotator means 11. The i-th comparator means 38-i output is also connected to the selector S input of the associated i-th stage 14-i of in the first pipeline rotator means 14 of the multiplicand portion 12. Thus, first comparator 38-1 receives its input from first pipeline stage terminal 11-1Q', at input 11-1a, and provides its output data bit to selector terminals 11-1s and 14-1s. Second comparator 38-2 receives its input from the imaginary-portion data terminal 11-2Q' of the second stage and provides its output data bit to selector terminals 11-2s and 14-2s, and so on, with the i-th comparator 38-i receiving its input from the Q' imaginary-portion data input 11-iQ' of stage 11-i, and providing its output data bit to the parallel-connected selector terminals 11-is and 14-is, until, finally, the n-th comparator 38-n receives its input from the n-th stage Q' data bit 11-nQ' and provides its output to the paralleled selector terminals 11-ns and 14-ns.

Cross-correlator 10 also includes a plurality Nx(M−1) of delay means 40, each for delaying by one common time interval (CTI) the data input thereto. One of delay means 40 is located between the sample bus of each i-th stage in each of the first (M−1) rotator means of portion 12, and the identical i-th stage in the next rotator means. Thus, there are N delay means 40-i1, each with an input connected to the selection bus of an associated i-th one of first rotator means 14 and with an output connected to the selection bus of the i-th stage of second rotator means 15. Each of another N delay stages 40-i2 is connected between the i-th stage of second rotator means 15 and the like i-th stage of third rotator means 16, just as there are an additional N delay stages from the third rotator means 16 to the fourth rotator means 17, and so on. Thus, the multiplicand first rotator first stage 14-1 bus output S' is connected to the input of a delay stage 40-11, having its output connected to the select input 15-1s of the second rotator first stage; that stage output S' is connected to the input of a delay means 40-12, having its output connected to the select input 16-1s of the first stage of the third pipeline, and so forth. Similarly, the first multiplicand rotator second stage 14-2 select terminal S' is connected to the input of another delay stage 40-21, having its output connected to the second multiplicand rotator second stage select bus 15-2s, which is itself connected to the input of a next delay stage 40-22, having its output connected to the third pipeline second stage select bus 16-2s, which is connected to the input of a next delay stage, and so on. The j-th multiplicand rotator 18 thus has a first stage 18-1 with a select input 18-1s receiving the output data from a delay means 40-1(j-1), which data has now been delayed by a total of (j-1) delay intervals, while the second stage 18-2 of that pipeline rotator receives the output of another delay means 40-2 (j-1), and the i-th stage 18-i of the j-th pipeline receives a select signal from the output of delay means 40-i(j-1), and so forth.

Associated with each of the multiplicand pipelines of portions 12 is a pair of real-portion and imaginary-portion data-outputs 14-nI/14-nQ, 14-nI/15-nQ, 16-nI/16-nQ, . . . , 18-nI/18-nQ, . . . or the like. Each of the I/Q pair of signals from a multiplicand pipeline is processed the same manner in an associated one of M final sections 14-p, 15-p, . . . , 18-p, . . . . Thus, the first multiplicand pipeline imaginary-portion data output 14-nQ is connected to one input of a multiplier means 42-1a, which receives the multiplier real-part absolute value $|X|$ data at a second input, via the multiplicand section input 12c, from first rotator pipeline output 11c. Each of multipliers 42 can be provided, if desired, by an appropriate shift-register/adder implementation, as well known to the art. The data product at the output of each multiplier means 42 (e.g. means 42-1a) is provided to the input of an associated block delay means 44 (e.g. means 44-1a) for a delay of N common time intervals. The multiplier data output is also provided directly to a first additive input of a first adder means 46 (e.g. means 46-1a), which receives at its second additive input the negation of the block-delayed data from the output of the associated block delay means 44 (e.g. means 44-1a). The output sum data from means 46 is provided to a first additive input of a second adder means 48 (e.g. means 48-1a) having a second additive input receiving data from the associated correlator output (e.g. output $C_Q(0)$). The output of second adder means 48 is provided to the input of a clocked accumulator means 50 (e.g. means 50-1a) at the output of which the associated correlator output is taken.

In operation, the complex input signal X data drives the CORDIC rotator pipeline 11; the rotation in each pipeline stage (as determined by the data bit on the select bus of that stage) is determined by the sign of the imaginary-portion data (i.e. the Q data) which is input from the previous stage. That is, $\xi_i = \text{SGN}(Q_{i-1})$, where $\xi_i$ is the sign of rotation of the i-th stage, and $\xi_1$ is given by the polarity of the imaginary-portion $X_{Im}$ data at input 11a. Correlator 10 thus processes the data to reduce the angle such that the first rotator 11 provides a real-portion output (i.e. the I-portion output) which is the first input signal absolute magnitude $|X|$. In addition, the sign of the Q input signal from each stage of the first CORDIC pipeline rotator means 11 also determines the sign in each stage of all subsequent CORDIC pipeline rotator means in multiplicand portion 12, causing the multiplicand portion complex data input signal -Y to be rotated through the same phase angle, with respect to the angle Q through which the first CORDIC means rotates the multiplier X complex digital data to arrive at a substantially zero angle. Preservation of the sign bit between two pipeline structures causes the multiplicand pipelines to rotate their output data to a phase equal to the difference of the phases of the two complex data inputs, if the other multiplier (here multiplier 11) rotates its input data to a zero angle, to provide only a real data magnitude at its output, and a substantially zero-magnitude remainder at the Q output (e.g. output 11-nQ) thereof. Thus, this is an effective complex conjugate multiply with respect to the phase of the input pair of complex digital data signals for each sampling interval thereof. The complex correlation is completed by multiplying both complex data streams of each multiplicand portion pipeline rotator by the magnitude signal output from the first CORDIC pipeline means 11. The sign information, as well as the magnitude output, of the first CORDIC pipeline 11 is time delayed to all of the pipeline rotators 14, 15, 16, . . . , 18, . . . so that the time delay to the j-th pipeline is j times the common interval (CTI). In this manner, the appropriate sign (phase) and amplitude information arrives at the j-th multiplicand pipeline rotator exactly in coincidence with the Y input data appropriate for computation of the j-th component of the correlation function. With the accumulation of data over N samples, the output of each of the multiplicand pipelines provides the appropriate complex output signal C (j).

While one presently preferred implementation of our novel complex CORDIC correlator has been described by way of example herein, many modifications and variations will now become apparent to those skilled in the art. It is our intent, therefore, to be limited only by the scope of the appending claims and not by way of explanation of the preferred embodiments described herein.

What is claimed is:

1. Apparatus for cross-correlating first and second complex digital data signals, comprising: a multiplier section having a first pipeline CORDIC rotator means with a plurality N of sequential stages, receiving separate and independent imaginary and real portions of the first complex data signal, for rotating the independent imaginary and real portions through predetermined decreasing angles $\alpha$ to progressively reduce the magnitude of the imaginary-portion of the first complex data signal toward zero in each of the plurality N of sequential stages, and providing output data equal to the absolute value of the first complex data signal; and a multiplicand section having a plurality M of additional pipeline CORDIC rotator means, each means having a like plurality N of sequential stages, for modifying the read and imaginary portions of the second complex data signal to cause rotation, responsive to a selection signal, through each of like angles $\alpha$ and with a rotation in each j-th rotator means, where $1 \leq j \leq (M-1)$, being progressively delayed by one common delay time interval greater than a total time delay in the previous (j-1)-th rotator means; and means for arithmetically processing the modified second complex data signal from all of the M additional rotator means to provide, at any one time one set of data corresponding to the cross-correlation of both complex signals at that time.

2. The apparatus of claim 1, wherein each of the plurality N of stages in the first rotator means rotates each real and imaginary input data portion in a direction selected by a selection data bit state dependent upon a sign of the imaginary-portion data input to that stage; and each stage includes one of a plurality N of comparator means for monitoring the stage imaginary-portion data input to establish the said selection data bit state.

3. The apparatus of claim 2, wherein the comparator means connected to each stage of the first rotator means receives the imaginary-portion data output from an immediately previous stage.

4. The apparatus of claim 1, wherein angle $\alpha_i$ is the rotational angle for the i-th stage, where $1 \leq i \leq N$, with $\alpha_1 = 90°$ and $\alpha_i = \tan^{-1}(2^{-n})°$ with n=i-31 2 i=2,3,... ,N.

5. The apparatus of claim 1, wherein said multiplicand section further includes: a plurality $(M-1) \times N$ of means for delaying an input data signal by one common-time-interval (CTI), each delay means receiving the selection signal from a selected i-th stage, where $1 \leq i \leq N$, of a previous j-th one of the additional rotator means and providing a delayed selection signal to the same i-th stage of a next (j+1)-th one of the additional rotator means; and a plurality 2M of final means, each coupled to one of the real-portion and imaginary-portion outputs of each of the M additional rotator means, for processing that rotator means output with the first complex data signal absolute value to obtain a like portion of that one of M time-delayed correlator data outputs.

6. The apparatus of claim 5, wherein each of said plurality of final means includes: means for obtaining data equal to a product of the associated multiplicand section output data and the multiplier section absolute value output data; means for delaying the product data by N common-time-intervals (CTIs); first adder means for subtracting the delayed product data from the product data to provide a first added output; second adder means for adding the first added output and a correlator data output for that portion, to provide a second added output; and means for accumulating the second added output to provide the portion correlator data output.

* * * * *